United States Patent

Boulin et al.

[15] 3,636,481

[45] Jan. 18, 1972

[54] MODULAR ELEMENTS FOR ELECTRICAL FILTERS AND FILTERS EMPLOYING THE SAME

[72] Inventors: Jacques R. Boulin, Paris; Marcel R. Bertin, Sceaux; Alexis Nepomiastchy, Bagneux, all of France

[73] Assignee: Societe Anonyme de Telecommunications, Paris, France

[22] Filed: Mar. 30, 1970

[21] Appl. No.: 23,797

[30] Foreign Application Priority Data

May 2, 1969 France ..................................6913976

[52] U.S. Cl. ...........................333/70 S, 317/101 R, 317/261

[51] Int. Cl. .........................................H03h 1/00, H03h 7/10

[58] Field of Search .........................333/70 S, 70, 79, 29, 23; 317/101, 261

[56] References Cited

UNITED STATES PATENTS

| | | | |
|---|---|---|---|
| 2,390,563 | 12/1945 | Tawney | 333/29 |
| 2,648,031 | 8/1953 | Lang et al. | 317/101 |

*Primary Examiner*—Herman Karl Saalbach
*Assistant Examiner*—Marvin Nussbaum
*Attorney*—Abraham A. Saffitz

[57] ABSTRACT

Electrical filter modular elements built in the form of sealed units, having two, three, or four external connection terminals, contained in a metal casing formed by a cap and a baseplate and having a generally parallelepipedal shape, said elements comprising a variable inductance and one or more fixed capacitors disposed inside the casing and connected to one another and to said inductance and terminals, the latter consisting of connection pins extending through said baseplate in a direction perpendicular thereto. The inductance and capacitors are stacked parallel to the plane of said plate and form a block borne at the bottom on an insulated socket through which said pins extend; the capacitors are of flat shape with wrapping plates parallel to said plane, preferably without insulating coating or impregnation, and are stacked in a recess provided in said socket.

12 Claims, 7 Drawing Figures

INVENTORS
JACQUES R. BOULIN
MARCEL R. BERTIN
ALEXIS NEPOMIASTCHY

Abraham A. Saffitz
ATTORNEY

INVENTORS
JACQUES R. BOULIN
MARCEL R. BERTIN
ALEXIS NEPOMIASTCHY

Abraham A. Saffitz
ATTORNEY

INVENTORS
JACQUES R. BOULIN
MARCEL R. BERTIN
ALEXIS NEPOMIASTCHY
Abraham A. Saffitz
ATTORNEY

INVENTORS
JACQUES R. BOULIN
MARCEL R. BERTIN
ALEXIS NEPOMIASTCHY

Abraham A. Saffitz
ATTORNEY

MODULAR ELEMENTS FOR ELECTRICAL FILTERS AND FILTERS EMPLOYING THE SAME

This invention relates to a new design of electric frequency filters comprising variable inductances and fixed capacitors.

According to the known processes generally used heretofore, an electric filter is made by connecting together to an appropriate circuit the components forming the filter, these components having previously been fixed on a baseplate. The filter adjustment is carried out on the filter elements already connected and mechanically fixed, thus allowing for capacitive and inductive couplings between these components and the surrounding circuits. However, apart from access to the inputs and outputs, accurate adjustment of the filter makes it necessary to provide the circuit with other access points or disconnection of intermediate circuits so that one element can be adjusted without the adjustment being obstructed by the presence of associated elements.

Also, in the prior art, numerous electric circuits are made from preassembled modular elements or modules. Heretofore, the production technology for filters did not enable this method to be used because of the difficulties occurring in the final adjustment of the filter as a result of the interaction of the components. On the contrary, the method of constructing filters according to the invention uses electrical elements made in the form of modules so that they can be associated to form a filter without any modification of their electrical characteristics. After the elements have been assembled, the filter constructed according to the invention requires no additional adjustment.

According to the invention, there is provided an electrical filter modular element constructed in the form of a sealed unit having two, three or four external connection terminals and contained in a casing formed by a metal cap and a metal baseplate, which form an electrical and magnetic shield and have a generally parallelepipedal shape, the said element comprising a variable inductance and one or more fixed capacitors disposed inside the casing and connected to one another and to the terminals, the connecting terminals being formed by external connection pins extending through the metal baseplate forming the bottom surface of the casing in a direction substantially perpendicular to the said surface and at points adjacent the corners thereof, said element being characterized in that:

a. the said inductance and the said capacitors are stacked parallel to the plane of the said surface and form a block which is borne at the bottom on an insulating socket through which the external connection pins extend;

b. the capacitors are of flat shape with wrapping plates which form a shielding substantially parallel to the said plane and are stacked in a recess provided in the said socket with the interposition of thin insulating plates between the said stacked capacitors;

c. the said capacitors are provided with contact pins substantially perpendicular to the said plane and each situated in the immediate vicinity of one of the said external connection pins, the contact pins making contacts between the said capacitors, the said external external connecting pins and two connecting tags forming the terminals of the said inductance;

d. the said inductance is disposed at the top of the stack and is provided with an adjustment means accessible through the top surface of the casing.

The invention also relates to electric filters formed by the assembly of modules of the above type manufactured and adjusted finally and individually before assembly. Such filters have numerous advantages; more particularly, they allow each module to be manufactured and adjusted individually in a similar way to the conventional practice for ordinary electronic components; they enable electric filters to be produced simply by the association of the modules, e.g., by their electrical connection by means of a printed wiring; and they allow maximum efficiency in mass production of electric filters as a result of the standardization of the external dimensions of the modules and their components, no matter what the values of the latter are.

The casing enclosing the electric filter element according to the invention also forms a sealed cover which provides mechanical and climatic protection of the components. Consequently the latter require no impregnation and no coating because the sealing properties of the casing are a sufficient barrier to corrosive agents in the atmosphere, particularly moisture, and also protect the components from any mechanical stresses.

The modules differ from one another in respect of the values of the components —capacity of the capacitors, inductance, magnetic circuit —and the connecting circuits. However, an important feature of the construction of the modules is that despite the diversity of the types all the modules have an identical construction geometry. They have in fact identical external module dimensions, identical positions for the electrical access points on the outside of the module, they have identical positions of the components inside the module, they have identical positions for the electrical connecting points for the components, they have identical positions for the adjustment means and identical main component dimensions.

Other features and advantages of the invention will be more readily apparent from the following description which is given with reference to the accompanying drawings wherein.

Figure 1:
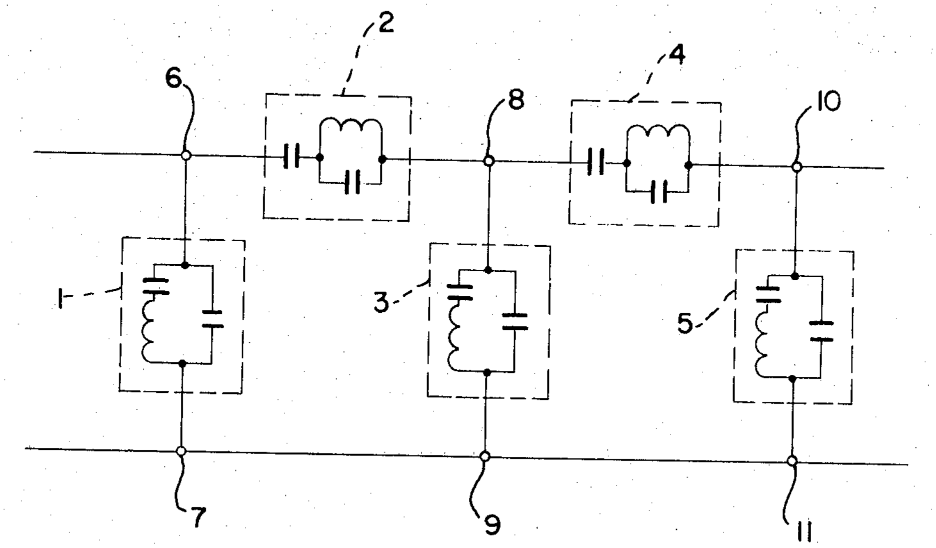
FIG. 1 illustrates an example of an electrical filter divided up into modules according to the method of the invention.

Referring to FIG. 1, the various components of the filter circuit shown in this figure are grouped into 5 unit circuits or modules numbered 1 to 5.

In this specific case of FIG. 1, each of these modules is a two-terminal one, and once each module has been built and adjusted individually all that is required is for the junction points 6, 7, 8, 9, 10 and 11 of the filter circuit to be connected, for example by means of printed wiring.

The form and arrangement of the connections of the components used and the method of connecting them are such that the number of connecting points is substantially smaller than the number of points which would be required if the components were mounted and connected together by printed wiring.

Figure 2:
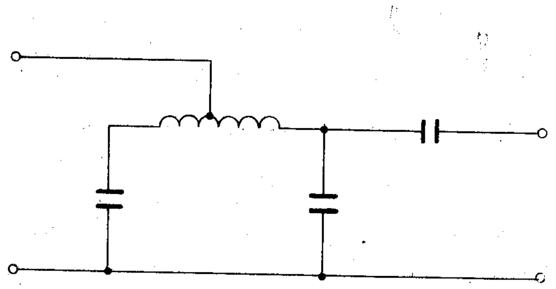
FIG. 2 shows a filter element which can advantageously be constructed in the form of a module according to the invention.

As an example, the construction of the unit circuit shown diagrammatically in FIG. 2 would require 12 connecting points if the separate components were mounted on a printed circuit board, whereas its construction according to the invention requires only nine such points.

Figure 3:
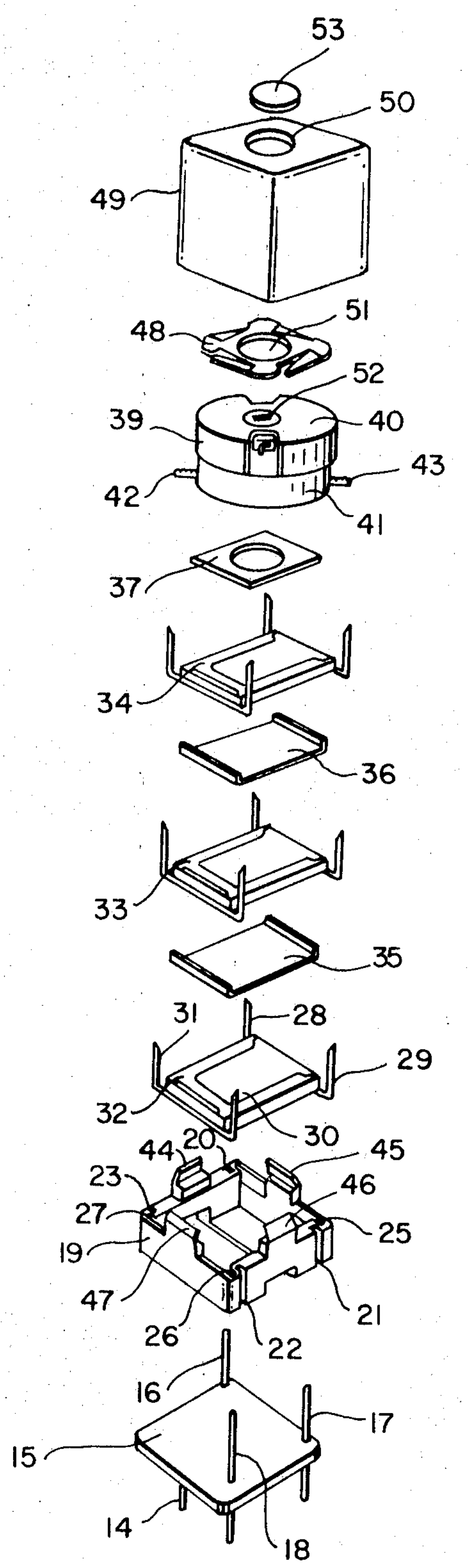
FIG. 3 illustrates the various mechanical and electrical components whose assembly forms a module according to the invention.

Each of the five unit circuits is constructed to a standard module, the component parts of which are shown in FIG. 3. Starting from the bottom, the module comprises a metal baseplate 15 through which extend three output pins 16, 17 and 18 which are fixed therein by means of glass beads or any other insulating means. On completion of the module assembly, the plate 15 is welded to the cap 49 to ensure that the casing formed by 15 and 49 is sealed. The insulating socket 19, made for example from moulded plastic, is fitted onto the plate 15, which is substantially square in shape. External notches 20, 21, 22 and 23 are provided in the socket 19 for the passage of the pins 16, 17 and 18 which also locate the socket 19 on the plate 15. Inside the socket 19, other notches 24, 25, 26 and 27 are intended for the passage of connecting pins (e.g., 28, 29, 30 and 31) of capacitors, e.g., 32, which are accommodated inside the socket 19. 1, 2 or 3 capacitors of the same or different values, e.g., 32, 33 and 34, can be accommodated inside the recess provided in the socket 19 and be separated from one another by thin insulating plates, such as 35, 36 and 37. The insulating plates 35 and 36 are of the same type and separate two capacitors while the insulating plate 37 separates the capacitor 34 from the inductance 39. The latter comprises two ferrite pot parts 40 and 41, the coil disposed inside the pot, and connecting tags 42 and 43. The inductance 39 is held in position by flexible lugs 44, 45, 46 and 47 of the socket 19. The connecting tags 42 and 43 are situated substantially on a diagonal of the square, three apices of which are formed by the pins 16, 17 and 18, in order to facilitate the connection of the tags to two of the latter pins. The spring 48 is placed on the inductance 39 and being locked by the cap 49 prevents any relative movement of the various components of the module. The cap 49, which may be made from magnetic or nonmagnetic metal according to requirements forms a magnetic or electrostatic shielding for the circuit and is formed with an aperture 50 whereby the value of 39 can be adjusted, via the aperture 51 in the spring 48, by means of the adjusting screw 52. When the adjustment has been carried out, a closure washer 53 closes the aperture 50 in the cap 49, to which it is welded permanently, since there is no need for any readjustment after the filter circuit has been assembled.

In order to construct the various possible circuits, in conjunction with the choice of the position of the inductance outputs, only the minimum number of output pins is retained for the number of capacitors required, generally two or three; the unnecessary pins are cut off. The remaining pins are used for the connection of the capacitors either to one another or to the pins 16, 17 and 18, or to the connecting tags 42 and 43 of the inductance. The pins to be interconnected are readily soldered together, since they are parallel and very close to one another.

The module consisting of an inductance and one or more associated capacitors thus has one or more characteristic frequencies. Only one of these frequencies is selected as having to be adjusted with high accuracy when the module is set to the required frequency —the accuracy is usually of the order of 1/1000. The values of the other characteristic frequencies are not adjusted and will have the accuracy of the components used. This accuracy is usually of the order of 1 percent.

Earthing pins for the casing, e.g., 14 in FIG. 3, can also be directly fixed on the socket 15.

Figure 4:
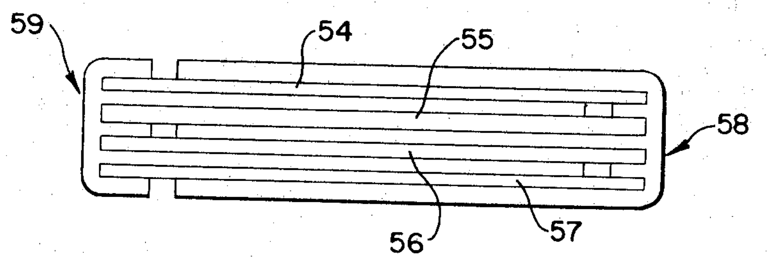
FIG. 4 is a sectional view of a capacitor used in the module according to the invention.

The capacitors used, e.g., 32 in FIG. 3, are mica capacitors, one electrode of which is a plate which forms a wrapping and shielding, as shown in section FIG. 4, in which, as an example, there are four mica strips 54 –57 metallized on both surfaces so that they can be stacked as shown in FIG. 4. The capacitor has a wrapping plate 58 and a wrapped or embedded plate 59. To reduce size and more satisfactorily define the mutual capacities between the plates of different capacitors, it is preferable to use capacitors which have no insulating impregnation or coating.

Figure 5A:
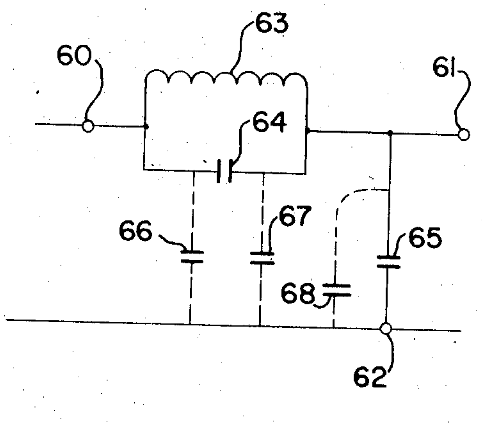
FIG. 5 is a diagram showing the advantages of using capacitors having a wrapping plate in the construction of a module according to the invention.
Figure 5B:
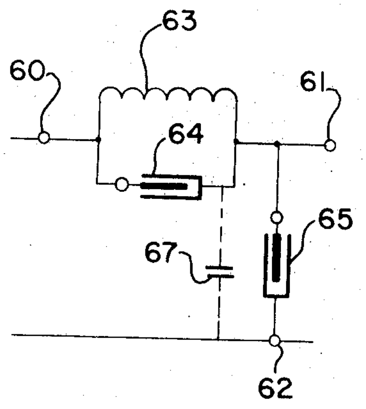

In the construction of the module according to the invention, it is important to use capacitors having a wrapping plate, firstly in order to reduce spurious mutual capacities and secondly —if a spurious capacity cannot be reduced—so that it is possible to know its value and hence calculate the value of the effective parameters of the module. For example, FIG. 5 shows a three-terminal filter element whose outputs are 60, 61 and 62, 62 being connected to the casing as "the ground." This module comprises an inductance 63 and two capacitors 64 and 65. With symmetrical capacitors, the module constructed as shown in FIG. 5a would have spurious capacities 66, 67 and 68 which would be poorly defined and which it would be difficult to calculate. On the other hand, the circuit shown in FIG. 5 which shows the same module constructed with capacitors with a wrapping plate, has only one spurious capacity 67 between the wrapping plate of the capacitor 64 and the grounded casing, the wrapped plates of the capacitors 64 and 65 having no spurious capacity and the wrapping plate of the capacitor 65 itself being grounded. Since the geometry of the module according to the invention is very strict and always the same, there is no difficulty in determining the spurious capacity 67 and the appropriate value of the capacitor 65 can then be calculated, the two capacities 65 and 67 being in parallel.

Figure 6:
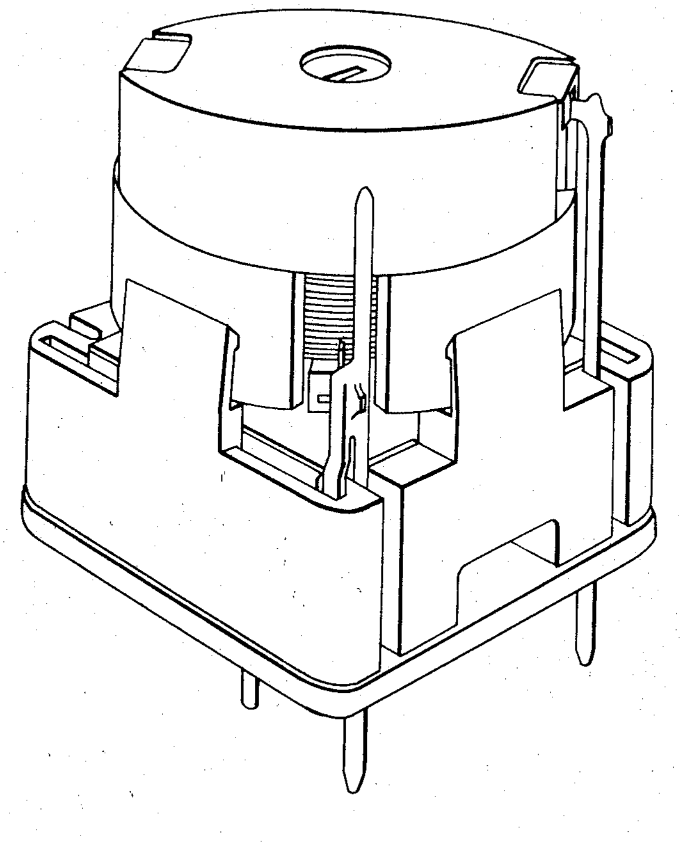
FIG. 6 is a perspective view of the module according to the invention with its casing removed.

FIG. 6 shows an assembled and connected module with its casing removed. The connecting points are visible in this drawing. These points are situated in accurately located positions which are always the same irrespective of the type of connecting circuit to be produced.

Immediately before the final welding of the casing, the latter may advantageously be filled with nitrogen or dry air to prevent any subsequent damage due to moisture.

Thus a large number of types of filter circuits can be constructed at low cost, particularly for telecommunications purposes.

What is claimed is:

1. An electrical filter modular element constructed in the form of a sealed unit having from two to four external connection terminals and contained in a casing formed by a metal cap and a metal baseplate, said baseplate forming the bottom surface of said casing, said casing forming an electrical and magnetic shield and having a generally parallelepipedal shape, said element comprising a variable inductance and a plurality of fixed capacitors disposed inside said casing and connected to one another and to said terminals and inductance, said terminals consisting of external connection pins extending through said base plate in a direction substantially perpendicular to said bottom surface and at points adjacent the corners thereof, in which:

a. said inductance and capacitors are stacked parallel to the plane of said surface and form a block which is borne at the bottom on an insulating socket through which said external connection pins extend;

b. said capacitors are of flat shape with wrapping plates which form a shielding substantially parallel to said plane and are stacked in a recess provided in said socket with the interposition of thin insulating plates between said stacked capacitors;

c. said capacitors are provided with contact pins substantially perpendicular to said plane and each situated in the immediate vicinity of one of said external connection pins, said contact pins making contacts between said capacitors, said external connecting pins and two connecting tags forming the terminals of said inductance;

d. said inductance is disposed at the top of the stack and is provided with an adjustment means accessible through the top surface of said casing.

2. An electric filter element according to claim 1, in which said casing has a substantially cubic shape and in which said baseplate is substantially square.

3. An electric filter element according to claim 1, in which said connecting tags of said inductance are disposed along a diagonal of the rectangle formed by said external connecting pins.

4. An electric filter element according to claim 1, in which the adjustment of the element is effected by a ferrite screw screwed into a ferrite pot (magnetic circuit) and which can be adjusted through an aperture disposed at the top of said casing, said aperture being provided with a metal closure disc which is welded to the casing after the adjustment has been completed.

5. An electric filter element according to claim 1, in which said contact pins of said capacitors are at least partly parallel to said external connecting pins and very close thereto.

6. An electric filter element according to claim 5, in which at least part of said contact pins is soldered to said external connecting pins.

7. An electric filter element according to claim 1, in which said cap is soldered to said baseplate to form said casing.

8. An electric filter element according to claim 1, in which said insulating socket is provided with flexible lugs to hold the inductance in a specific position relative to said socket.

9. An electric filter element according to claim 1, in which said external connection pins are insulated from said baseplate by glass beads.

10. An electric filter element according to claim 1, in which said capacitors are mica capacitors without insulating coating and impregnation by insulating material.

11. An electric filter element as claimed in claim 1, in which said casing is filled by dry air before its sealing.

12. An electric filter element as claimed in claim 1, in which said casing is filled by dry nitrogen before its sealing.

* * * * *